United States Patent
Okawa et al.

(10) Patent No.: US 6,753,368 B2
(45) Date of Patent: Jun. 22, 2004

(54) BRANCHED POLYACETAL RESIN COMPOSITION

(75) Inventors: Hidetoshi Okawa, Fuji (JP); Kuniaki Kawaguchi, Fuji (JP); Yoshihisa Tajima, Fuji (JP)

(73) Assignee: Polyplastics Co., Ltd., Osaka (JP)

( * ) Notice: Subject to any disclaimer, the term of this patent is extended or adjusted under 35 U.S.C. 154(b) by 511 days.

(21) Appl. No.: 09/869,808

(22) PCT Filed: Dec. 1, 2000

(86) PCT No.: PCT/JP00/08540
§ 371 (c)(1),
(2), (4) Date: Aug. 8, 2001

(87) PCT Pub. No.: WO01/40375
PCT Pub. Date: Jun. 7, 2001

(65) Prior Publication Data
US 2002/0193480 A1 Dec. 19, 2002

(30) Foreign Application Priority Data
Dec. 2, 1999 (JP) .......................... 11-343617

(51) Int. Cl.[7] .............................. C08K 5/09; C08K 5/06

(52) U.S. Cl. ....................... 524/320; 524/366

(58) Field of Search ................. 524/320, 366; 528/419

(56) References Cited

U.S. PATENT DOCUMENTS 6,278,008 B1 * 8/2001 Endo et al. ................. 554/227

FOREIGN PATENT DOCUMENTS

JP 3-170526 7/1991
JP 8-12734 1/1996

* cited by examiner

Primary Examiner—Kriellion A. Sanders
(74) Attorney, Agent, or Firm—Nixon & Vanderhye, P.C.

(57) ABSTRACT

To provide a resin material in which various properties such as excellent appearance and rigidity inherent to a polyacetal resin are maintained and to which the antistatic property is given. That is, a branched polyacetal resin composition, comprising 100 parts by weight of a branched polyacetal copolymer (A) having an oxymethylene group as the main repeating unit and having a branching unit represented by the following formula (I), and 0.1 to 30 parts by weight of a compound (B) having a polyalkylene ether unit as the main constituting component and/or 0.01 to 10 parts by weight of an ester (C) of fatty acid with polyhydroxyl alcohol having a hydroxyl group:

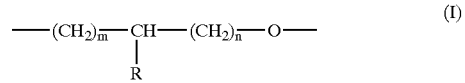

wherein m and n each is an integer of 0 to 5; the sum of m+n is 1 to 5; and R is a monovalent organic group having a molecular weight of 40 to 1000.

9 Claims, No Drawings

BRANCHED POLYACETAL RESIN COMPOSITION

TECHNICAL FIELD OF THE INVENTION

The present invention relates to a branched polyacetal resin composition having high rigidity and excellent in antistatic performance.

PRIOR ART

A polyacetal resin has excellent properties in mechanical property, fatigue properties, thermal property, electric property, slidability, moldability, etc. and has been widely used mostly as structural materials, functional parts, etc. in electric instruments, car parts, precision machine parts, etc. However, since the polyacetal resin itself has high'surface specific resistance, and obstacles attributable to charging, such as static electricity noises, adhesion of foreign matter onto the surface thereof, etc. are estimated depending on use, the field of utilization thereof has been limited by itself. To cope with such obstacles caused by static electricity, it has been proposed to compound the polyacetal resin with various antistatic agents.

For example, it is known that polyalkylene glycols such as polyethylene glycol and fatty esters of polyvalent alcohols having hydroxyl group are suitably hygroscopic and improve electrical conductivity and antistatic properties by incorporating into the polyacetal resin. However, when the polyacetal resin is compounded with polyalkylene glycols, etc., the strength of the resin is significantly reduced to cause a problem in practical use. Further, a long-term stability of the antistatic properties is insufficient. Accordingly, the means of merely compounding the polyacetal resin with the additives cannot meet with the properties demanded, which are becoming more and more high, complex, and special in recent years.

In view of the prior art described above, the present inventors presumed that, in order to endow the polyacetal resin with antistatic properties while maintaining various properties inherent thereto, modification of the polymer skeleton of a polyacetal resin and design of the resin composition based on such a polymer hold the important key to the solution of the problems. With regard to such a modification of the polymer skeleton of a polyacetal resin, JP-A 3-170526 discloses a modified polyacetal copolymer prepared by a copolymerization of at least one cyclic ether compound selected from ethylene oxide, 1,3-dioxolane, 1,3-dioxepane, 1,3,5-trioxepane and 1,3,6-trioxocane and at least one compound selected from glycidyl phenyl ether, styrene oxide and glycidyl naphthyl ether. However, an object of these modified polyacetal copolymers is to the improvement of moldability, particularly high cycling ability, by an increase in crystallizing rate, and there is no or less disclosure therein of improvement of other characteristics.

DISCLOSURE OF THE INVENTION

An object of the present invention is to solve the above problems and to provide a resin material endowed with antistatic property while maintaining various properties of polyacetar resin such as excellent appearance and rigidity.

For achieving the above object, the present inventors have carried out a detail investigation going deeply into the molecular skeleton and physical properties of the polyacetal resin. As a result, they have found a combination of modification of the polymer skeleton, which is effective for achieving the object, and the components effectively incorporated to the polymer, whereupon the present invention has been achieved.

That is, the present invention relates to a branched polyacetal resin composition in which 100 parts by weight of a branched polyacetal copolymer (A) having an oxymethylene group as the main repeating unit and having a branching unit represented by the following formula (I) is compounded with 0.1 to 30 parts by weight of a compound (B) having a polyalkylene ether unit as the main constituting component, and/or 0.01 to 10 parts by weight of an ester (C) of fatty acid with polyhydric alcohol having a hydroxyl group:

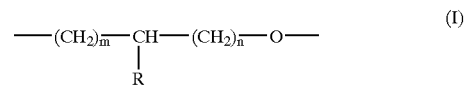

wherein m and n each is an integer of 0 to 5; the sum of m+n is 1 to 5; and R is a monovalent organic group having a molecular weight of 40 to 1000.

The composition comprises (A) and at least one of (B) and (C).

DETAILED DESCRIPTION OF THE INVENTION

The present invention will be explained in detail. First, the branched polyacetal copolymer (A) used as the base resin in the present invention has an oxymethylene group (—CH$_2$—O—) as the main repeating unit and has a branching unit represented by the following formula (I). The presence of the branching unit is one of the important elements for achieving the object of the present invention. The object of the present invention cannot be achieved by a common polyacetal resin not having the branching unit, even if the compounds (B) or (C) described below is compounded.

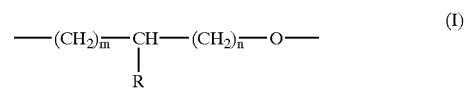

wherein m and n each is an integer of 0 to 5; the sum of m+n is 1 to 5; and R is a monovalent organic group having a molecular weight of 40 to 1000.

In the branching unit represented by the formula (I), the branching group R is a monovalent organic group having a molecular weight of 40 to 1000. If the molecular weight of R is less than 40, the maintenance or improvement of rigidity cannot be expected, whereas if the molecular weight exceeds 1000, there is the problem of a lowering of crystallinity. Preferably, the molecular weight of R is 50 to 500. The monovalent organic group forming R is preferably one having an aromatic ring, which is remarkably effective on maintenance or improvement of rigidity.

From the viewpoint of maintaining or improving rigidity and toughness and of maintaining other physical properties, it is preferable that the branching unit represented by the formula (I) is present at random in the polymer skeleton, and the ratio of the branching unit is preferably 0.001 to 10 parts by weight, more preferably 0.01 to 3 parts by weight, to 100 parts by weight of the oxymethylene unit (—CH$_2$O—)

Although there is no particular limitation for the process for producing the branched polyacetal copolymer (A) of the present invention, the copolymer (A) is preferably prepared by a copolymerization of 100 parts by weight of trioxane (a), 0.001 to 10 parts by weight of a monofunctional glycidyl compound (b-1) and 0 to 20 parts by weight of a cyclic ether compound (c) copolymerizable with trioxane. The branched polyacetal copolymer (A) comprising such monomers can be produced easily and the resulting copolymers have excellent properties. The trioxane (a) used herein is a cyclic trimer of formaldehyde, which is generally obtained by a reaction of an aqueous solution of formaldehyde in the presence of an acid catalyst, and is used after purifying by distillation, etc. It is preferred that the trioxane (a) used for the polymerization contains as little as possible of impurities such as water, methanol and formic acid.

The branched polyacetal copolymer (A), composed of oxymethylene units and units (I), may be produced by copolymerizing (a) trioxane, (b-1) the monofunctional glycidyl compound and (c) the optional cyclic ether compound. Any glycidyl compound may be used to meet the definition of "R" of the formula (I).

The monofunctional glycidyl compound (b-1) refers to organic compounds having one glycidyl group in the molecule. Typical examples thereof include glycidols, glycidyl ethers composed of aliphatic or aromatic alcohols or (poly) alkylene glycol adducts thereof and glycidols, and glycidyl esters composed of fatty or aromatic carboxylic acids or (poly)alkylene glycol adducts thereof and glycidols. The monofunctional glycidyl compound (b-1) is used as a branched structure component of the branched polyacetal copolymer (A) used in the present invention.

As the monofunctional glycidyl compound (b-1), a glycidyl ether compounds represented by the following formulae (II), (III) and (IV) are preferred:

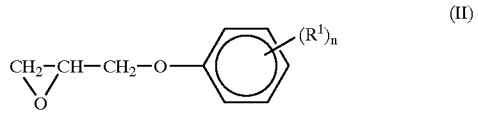

(II)

wherein $R^1$ is a $C_{1-12}$ alkyl group, a substituted alkyl group, an alkoxy group, an aryl group, a substituted aryl group or halogen; and n is an integer of 0 to 5 and, when n is 2 or more, the $R^1$s may be the same or different;

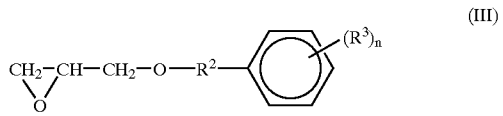

(III)

wherein $R^2$ is a $C_{1-30}$ alkylene group, a substituted alkylene group or a polyalkylene oxide glycol residue; $R^3$ is a $C_{1-12}$ alkyl group, a substituted alkyl group, an alkoxy group, an aryl group, a substituted aryl group or halogen; and n is an integer of 0 to 5 and, when n is 2 or more, the $R^3$s may be the same or different:

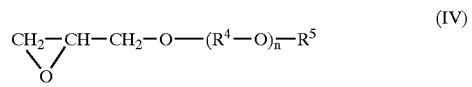

(IV)

wherein $R^4$ is a $C_{1-30}$ alkylene group; n is an integer of 0 to 20; and $R^5$ is a $C_{1-30}$ alkyl group, a $C_{2-20}$ alkenyl group or an alkynyl group.

Specific examples thereof include methyl glycidyl ether, ethyl glycidyl ether, butyl glycidyl ether, 2-ethyl hexyl glycidyl ether, 2-methyl octyl glycidyl ether, phenyl glycidyl ether, p-tert-butyl phenyl glycidyl ether, sec-butyl phenyl glycidyl ether, n-butyl phenyl glycidyl ether, phenyl phenol glycidyl ether, cresyl glycidyl ether, dibromocresyl glycidyl ether, and glycidyl ethers consisting of (poly) ethylene glycol adducts of aliphatic or aromatic alcohols and glycidols. Examples of the glycidyl ester compounds include glycidyl acetate and glycidyl stearate. Among them, those having aromatic rings are preferable. Particularly preferred are the compounds represented by the formulae (II) and (III) and having the substituent $R^1$ or $R^3$ at the ortho-position. As the substituent, preferred is one containing at least 4 carbon atoms, and particularly one having an aromatic ring. For example, o-phenyl phenol glycidyl ether.

In the production of the branched polyacetal copolymer (A) of the present invention, the amount of the monofunctional glycidyl compound (b-1) to be copolymerized is 0.001 to 10 parts by weight, preferably 0.01 to 10 parts by weight, more preferably 0.1 to 5 parts by weight, to 100 parts by weight of trioxane as the component (a). If the amount of the component (b-1) in the copolymer is too small, the effect of improving and maintaining physical properties such as strength and rigidity, as an object of the present invention, cannot be achieved, while if the amount is excessive, there is a fear that problems arise in the strength, rigidity etc. due to a lowering of crystallinity and in the moldability due to a lowering of fluidity.

As the monofunctional glycidyl compound (b-1), preferably used is one having a molecular weight of 100 to 1000. If the molecular weight of the monofunctional glycidyl compound (b-1) is too high, the branched chains of the resulting branched polyacetal copolymer (A) become longer, which may disturb the crystallinity of the resin, etc. to exert an undesired influence on the slidability as a basic property. On the other hand, if the molecular weight of the component (b-1) is too low, the effect of improving and maintaining the rigidity and toughness, as the object of the present invention is minimized.

The branched polyacetal copolymer (A) of the present invention is preferably copolymerized further with the cyclic ether compound (c) copolymerizable with trioxane as the copolymerizing component other than the components described above. The cyclic ether compound (c) is not particularly essential for improving the rigidity and toughness, as desired in the present invention, but this cyclic ether compound is used preferably as a copolymerizable monomer in order to stabilize the polymerization reaction for producing the branched polyacetal copolymer (A) and to improve the thermostability of the resulting branched polyacetal copolymer (A). Examples of the cyclic ether compound (c) copolymerizable with trioxane include ethylene oxide, propylene oxide, butylene oxide, epichlorohydrin, epibromohydrin, styrene oxide, oxetane, 3,3-bis (chloromethyl) oxetane, tetrahydrofuran, trioxepane, 1,3-dioxolane, ethylene glycol formal, propylene glycol formal, diethylene glycol formal, triethylene glycol formal, 1,4-butane diol formal, 1,5-pentane diol formal and 1,6-hexane diol formal. Among them, ethylene oxide, 1,3-dioxolane, diethylene glycol formal and 1,4-butane diol formal are preferable. In the branched polyacetal copolymer (A) used in the present invention, the amount of the cyclic ether compound (c) to be copolymerized is 0 to 20 parts by weight, preferably 0.05 to 15 parts by weight, more preferably 0.1 to 10 parts by weight, to 100 parts by weight of trioxane as component (a). If the amount of the cyclic ether compound (c) in the copolymer is too small, a copolymerization reaction becomes unstable and the resulting branched polyacetal copolymer is inferior in thermostability, while if the amount of the cyclic ether compound (c) in the copolymer is excessive, the resulting copolymer is poor in mechanical physical properties such as rigidity and strength, an object of the present invention.

Basically, the branched polyacetal copolymer (A) of the present invention is obtained, for example, by a method of bulk polymerization of the trioxane (a), the monofunctional glycidyl compound (b-1) and the cyclic ether compound (c) using a cationic polymerization catalyst, where if necessary, an appropriate amount of a molecular-weight regulator is added thereto.

Examples of the molecular-weight regulator include low-molecular acetal compounds having alkoxy groups such as methylal, methoxy methylal, dimethoxy methylal, trimethoxy methylal and oxymethylene di-n-butyl ether, alcohols such as methanol, ethanol and butanol, and ester compounds. Among these compounds, the low-molecular acetal compounds having alkoxy groups are particularly preferable. There is no limitation at all for the amount of such a molecular-weight regulator to be added so far as the effect of the present invention is not deteriorated.

Examples of the cationic polymerization catalyst include lead tetrachloride, tin tetrachloride, titanium tetrachloride, aluminum trichloride, zinc chloride, vanadium trichloride, antimony trichloride, phosphorus pentafluoride, antimony pentafluoride, boron trifluoride, boron trifluoride coordination compounds such as boron trifluoride-diethyl ethelate, boron trifluoride-dibutyl ethelate, boron trifluoride-dioxanate, boron trifluoride-acetic anhydrate and boron trifluoride-triethylamine, inorganic and organic acids such as perchloric acid, acetyl perchlorate, t-butyl perchlorate, hydroxyacetic acid, trichloroacetic acid, trifluoroacetic acid and p-toluene sulfonic acid, complex salt compounds such as triethyl oxonium tetrafluoroborate, triphenyl methyl hexafluoroantimonate, allyl diazonium hexafluorophosphate and allyl diazonium tetrafluoroborate, alkyl metal salts such as diethyl zinc, triethyl aluminum and diethyl aluminum chloride, heteropoly acid and isopoly acid. Among these compounds, boron trifluoride and boron trifluoride coordination compounds such as boron trifluoride-diethyl ethelate, boron trifluoride-dibutyl ethelate, boron trifluoride-dioxanate, boron trifluoride-acetic anhydrate and boron trifluoride-triethylamine complex are preferable. Such a catalyst may be diluted with an organic solvent or the like and then used.

In the branched polyacetal copolymer (A) used in the present invention, it is desirable that the constituent units derived from the monofunctional glycidyl compound (b-1) and the cyclic ether compound (c) are uniformly dispersed in a molecular chain of the polyacetal copolymer. For such a condition, the following process in the production of the polyacetal copolymer (A) is effective; a method in which the glycidyl compound (b-1), the cyclic ether compound (c) and the catalyst are uniformly mixed in advance and the resultant mixture is added to the molten trioxane (a) separately fed to a polymerizer, or a method in which the above uniform mixture is further mixed with the trioxane (a) and then they are polymerized in a polymerizer. Particularly, since the reaction rate of the glycidyl compound (b-1) is often slower than those of the other components (a) and (c), it is very effective to previously mix the component (b-1) with the catalyst. Thus, by mixing the components previously in the form of a uniform solution, a branched structure derived from the glycidyl compound is well dispersed.

There is no particular limitation for the polymerizer in the production of the polyacetal copolymer (A) used in the present invention but known apparatuses may be used and any of a batch system, a continuous method, etc. may be applicable. It is preferred to keep the polymerization temperature at 65 to 135° C. Deactiviation after the polymerization is carried out by adding a basic compound or an aqueous solution thereof to a reaction product discharged from the polymerizer after the polymerization reaction or to a reaction product in the polymerizer.

Examples of the basic compound for neutralizing and deactivating the polymerization catalyst include ammonia, amines such as triethyl amine, tributyl amine, triethanol amine and tributanol amine, hydroxide salts of alkali metal or alkaline earth metal, and other known deactivators of the catalyst. It is preferred that, after the polymerization, an aqueous solution thereof is added to the product without delay to conduct deactiviation. After such a polymerization and a deactivation, washing, separation/recovery of unreacted monomers, drying, etc. may be carried out by conventional methods, if necessary.

The polymerization degree and the like of the polyacetal copolymer (A) thus obtained and used in the present invention are not particularly limited. The polymerization degree and the like can be controlled in accordance with the purpose of the product and molding means. When the polymer is to be molded, the melt index (MI) thereof, as determined at a temperature of 190° C. under a loading of 2.06 kg, is preferably from 1 to 100 g/10 min., more preferably from 2 to 90 g/10 min. Further, a small amount of a cross-linking agent such as a diglycidyl compound can be copolymerized in order to control the viscosity.

In the process for producing the polyacetal copolymer (A) and the composition of monomers described above, it is possible to use a cyclic formal (b-2) compound capable of forming branched chains in place of the monofunctional glycidyl compound (b-1), and the obtained polyacetal copolymer (A) is as preferable as the above-described one. Examples of the cyclic formal compound capable of forming branched chains include 4-methyl-1',3-dioxolane, 4-ethyl-1,3-dioxolane, 4-isopropyl dioxolane and 4-phenyl-1,3-dioxolane.

Next, the compound (B) having a polyalkylene ether unit as the main constituting component and the ester (C) of fatty acid with polyhydric alcohol having a hydroxyl group, which are components of the present invention, will be described. The resin composition of the present invention is characterized by compounding the above-described branched polyacetal copolymer (A) with such antistatic components. The branched polyacetal copolymer, which is merely modified by introducing the branched structure, shows an improvement in rigidity but fails to achieve satisfactory antistatic performance; on the contrary, the conventional polyacetal resin having none of the branched structure, upon being compounded with these antistatic components, can be endowed with initial antistatic performance as described above, but fails to achieve satisfactory rigidity and long-term antistatic properties. By compounding the branched polyacetal copolymer (A) with the compound (B) having a polyalkylene ether unit as the main constituting component and/or the ester (C) of fatty acid with polyhydric alcohol having a hydroxyl group, it is possible to obtain an excellent resin composition having not only various characteristics such as rigidity but also antistatic performance, and this was completely unexpected and found for the first time by the present inventors as a result of their eager study.

The compound (B) having a polyalkylene ether unit as the main constituting component used in the present invention is a polyether whose polyalkylene ether unit as the major constituting component comprises a $C_{2-4}$ aliphatic ether group as the main repeating unit. It may be a homopolymer or a copolymer. There is no particular limitation for presence or absence of side chains and the type of its terminal groups. Examples thereof include polyethylene glycol, polypropylene glycol, polytetramethylene glycol, chlorohydrin rubber and copolymer glycols having these constituting units, and one or more of these compounds are used. Although those compounds having relatively low to high molecular weights can be used, their antistatic performance tends to be decreased as the molecular weight is increased. Thus, the molecular weight is preferably 20000 or less, more preferably about 400 to 1000. The compound (B) having such a polyalkylene ether unit as the main constituting component is compounded in an amount of 0.1 to 30 parts, preferably 0.2 to 20 parts by weight, particularly preferably 0.3 to 10 parts by weight, to 100 parts by weight of the branched polyacetal copolymer (A). An amount outside of these ranges is not preferable because if the amount of the component (B) compounded is too small, the effect of antistatic performance as the object of the present invention cannot be satisfactorily achieved, while if it is excessive, the properties of the branched polyacetal copolymer are lost.

The ester (C) of fatty acid with polyhydric alcohol having a hydroxyl group in the composition of the present invention is a fatty ester alcohol having at least one ester group and at least one free hydroxyl group, which is obtained by a reaction of fatty acid such as lauric acid, myristic acid, palmitic acid, stearic acid, arachic acid, behenic acid, montanic acid, citric acid, oleic acid and hydroxystearic acid, and polyhydric alcohol such as glycerin, pentaerythritol, diglycerin and sorbitol. The fatty ester (C) of polyvalent alcohol having a hydroxyl group is compounded in an amount of 0.01 to 10 parts by weight, preferably 0.03 to 5 parts by weight, particularly preferably 0.1 to 3 parts by weight, to 100 parts of the branched polyacetal copolymer (A).

In the present invention, a composition having well-balanced properties as desired in the present invention, can be obtained by only compounding with either of the compound (B) or the fatty ester (C) described above, and a still more preferable composition having further enhanced antistatic effect can be obtained by using these components in combination.

The resin composition of the present invention may preferably be blended with various stabilizers selected as necessary. Examples of the stabilizers include at least one selected from hindered phenolic compounds, nitrogen-containing compounds, alkali or alkaline earth metal hydroxides, inorganic salts and carboxylates. Further, one or more common additives for thermoplastic resin, such as coloring agents e.g. dye, pigment etc., lubricants, releasing agents, antistatic agents, surfactants, organic polymer materials, and inorganic or organic fillers in a form of fiber, powder and plate may be added as necessary as far as the object and effect of the present invention are not hindered.

The composition of the present invention can be easily prepared in any methods generally used for preparing conventional resin compositions. For example, a method in which the respective components are mixed, and kneaded and extruded in an extruder to prepare pellets, and then a predetermined amount of the pellets is mixed and molded into a molded article having a desired composition, or a method of directly introducing one or more of the respective components into a molding machine, and any of which can be used.

EXAMPLES

Now, the present invention will be described in detail by reference to the Examples, which are not intended to limit the present invention. Evaluation was conducted in the following manner.

[Tensile Strength]

A test piece of a dumbbell type was molded using an injection molding machine and the measurement was carried out in accordance with a method of ASTM D638.

[Bending Modulus]

A test piece was molded using an injection molding machine and the measurement was carried out in accordance with an ASTM method.

[Surface Specific Resistance]

Surface specific resistance ($\Omega$) was determined according to JIS K 6911.

Examples 1 to 12

A continuous mixing reactor constituted from a jacket for passing a heating (or cooling) medium at outside, a barrel having a shape where circles of two cross sections are partially overlapped, and rotating shafts equipped with a paddle was used, and trioxane (a), the monofunctional glycidyl compound (b-1) and the cyclic ether compound (c) were added thereinto in a ratio shown in Table 1 while each of two rotating shafts having a paddle was rotated at 150 rpm. Then, methylal was continuously fed as the molecular-weight regulator, and as the catalyst, a solution of boron trifluoride-dibutyl ethelate in dibutyl ether was mixed therewith in an amount of 0.005% by weight on a basis of boron trifluoride to the trioxane, and the uniform mixture was bulk-polymerized. The reaction product discharged from the polymerizer was immediately passed through a grinder and added to an aqueous solution containing 0.05% by weight of triethylamine at 60° C. to deactivate the catalyst. After separation, washing and drying, a crude polyacetal copolymer was obtained.

Then, to 100 parts by weight of the crude polyacetal copolymer were added 4% by weight of a 5% by weight aqueous solution of triethylamine and 0.3% by weight of pentaerythrityl-tetrakis [3-(3,5-di-tert-butyl-4-hydroxyphenyl) propionate], followed by subjecting to melting and kneading at 210° C. in a twin extruder to remove unstable parts. The structure and copolymerizing composition of the resulting polyacetal copolymer were confirmed by means of a $^1$H-NMR measurement using hexafluoroisopropanol-$d_2$ as a solvent.

To 100 parts by weight of the branched polyacetal copolymer obtained above, compounds (B) and (C) shown in Table 1 were added, and as the stabilizer 0.03 part by weight of pentaerythrityl-tetrakis [3-(3,5-di-tert-butyl-4-hydroxyphenyl) propionate] and 0.15 part by weight of melamine were added, followed by subjecting and kneading at 210° C. using a twin extruder whereupon a branched polyacetal resin composition in a form of pellets was obtained. Results of the evaluation as evaluated by the above-mentioned methods are shown in Table 1.

Comparative Examples 1 to 6

Compositions in a form of pellets were prepared in the same manner as in the Examples except that a polyacetal copolymer having no branched structure, prepared without using the monofunctional glycidyl compound (b-1), was used as the base resin, or the branched polyacetal copolymer was not blended with the compounds (B) and (C). Results are shown in Table 1.

TABLE 1

| | | Polyacetal copolymer (A); polymer composition | | | | | Resin composition | | | | | | |
|---|---|---|---|---|---|---|---|---|---|---|---|---|---|
| | | Trioxane (a) | Component (b-1) | | Component (c) | | parts by weight (A) | Component (B) | | Component (C) | | Tensile strength (MPa) | Bending Modulus (Mpa) | Surface resistance ($\Omega$) |
| | | parts by weight | Type | parts by weight | Type | parts by weight | | Type | parts by weight | Type | parts by weight | | | |
| Example | 1 | 100 | BGE | 0.3 | DO | 3.3 | 100 | PEG | 5 | — | — | 61 | 2350 | $5.7 \times 10^{12}$ |
| | 2 | 100 | BGE | 0.3 | DO | 3.3 | 100 | — | — | C1 | 0.1 | 64 | 2500 | $5.3 \times 10^{11}$ |
| | 3 | 100 | BGE | 0.3 | DO | 3.3 | 100 | PEG | 5 | C1 | 0.5 | 61 | 2350 | $3.6 \times 10^{11}$ |
| | 4 | 100 | BGE | 0.3 | DO | 3.3 | 100 | PEG | 5 | C2 | 0.5 | 61 | 2350 | $5.2 \times 10^{11}$ |
| | 5 | 100 | BGE | 0.3 | DO | 3.3 | 100 | PTMG | 5 | C1 | 0.5 | 61 | 2350 | $5.5 \times 10^{11}$ |
| | 6 | 100 | 2EHGE | 0.3 | DO | 3.3 | 100 | PEG | 5 | C1 | 0.5 | 60 | 2200 | $3.6 \times 10^{11}$ |
| | 7 | 100 | PGE | 0.03 | DO | 3.3 | 100 | PEG | 5 | C1 | 0.5 | 63 | 2400 | $3.6 \times 10^{11}$ |
| | 8 | 100 | CGE | 0.03 | DO | 3.3 | 100 | PEG | 5 | C1 | 0.5 | 63 | 2400 | $3.6 \times 10^{11}$ |
| | 9 | 100 | OPPG | 0.03 | DO | 3.3 | 100 | PEG | 5 | C1 | 0.5 | 62 | 2380 | $3.6 \times 10^{11}$ |
| | 10 | 100 | BGE | 0.3 | DO | 3.3 | 100 | PEG | 5 | C2 | 0.5 | 61 | 2340 | $4.3 \times 10^{11}$ |
| | 11 | 100 | BGE | 0.3 | DO | 3.3 | 100 | PEG | 2 | C1 | 2.0 | 63 | 2430 | $4.7 \times 10^{11}$ |
| | 12 | 100 | BGE | 0.3 | EO | 2.0 | 100 | PEG | 5 | C1 | 0.5 | 61 | 2340 | $4.3 \times 10^{11}$ |
| Com. Example | 1 | 100 | — | — | DO | 3.3 | 100 | — | — | — | — | 62 | 2300 | $1.0 \times 10^{16}$ |
| | 2 | 100 | — | — | DO | 3.3 | 100 | — | — | C1 | 1.0 | 58 | 2150 | $5.3 \times 10^{11}$ |
| | 3 | 100 | — | — | DO | 3.3 | 100 | PEG | 2 | C1 | 2.0 | 53 | 2020 | $4.7 \times 10^{11}$ |
| | 4 | 100 | — | — | DO | 3.3 | 100 | PEG | 5 | C1 | 0.5 | 50 | 1860 | $3.6 \times 10^{11}$ |
| | 5 | 100 | BGE | 0.3 | DO | 3.3 | 100 | — | — | — | — | 65 | 2530 | $1.0 \times 10^{16}$ |
| | 6 | 100 | 2EHGE | 0.3 | DO | 3.3 | 100 | — | — | — | — | 64 | 2500 | $1.0 \times 10^{16}$ |

Component (b-1)
BGE: Butyl glycidyl ether
2EHGE: 2-Ethyl hexyl glycidyl ether
PGE: Phenyl glycidyl ether
CGE: Cresyl glycidyl ether
OPPG: o-Phenyl phenol glycidyl ether
Component (c)
DO: 1,3-Dioxolane
EO: Ethylene oxide
Compound (B)
PEG: Polyethylene glycol (weight average molecular weight: 4000)
PPG: Polypropylene glycol (weight average molecular weight: 4000)
PTMG: Polytetramethylene glycol (weight average molecular weight: 4000)
Compound (C)
C1: Glycerin monostearate
C2: Glycerin monolaurate

What is claimed is:

1. A branched polyacetal resin composition, comprising 100 parts by weight of a branched polyacetal copolymer (A) having an oxymethylene group as the main repeating unit and having a branching unit represented by the following formula (I), and 0.1 to 30 parts by weight of a compound (B) having a polyalkylene ether unit as the main constituting component, and/or 0.01 to 10 parts by weight of an ester (C) of fatty acid with polyhydric alcohol having a hydroxyl group:

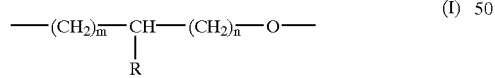

(I)

wherein m and n each is an integer of 0 to 5; the sum of m+n is 1 to 5; and R is a monovalent organic group having a molecular weight of 40 to 1000.

2. The composition according to claim 1, wherein R in the branching unit represented by the formula (I) is selected from a monovalent organic group having an aromatic ring.

3. The composition according to claim 1, wherein the branched polyacetal copolymer (A) is prepared by a copolymerization of 100 parts by weight of trioxane (a), 0.001 to 10 parts by weight of a monofunctional glycidyl compound (b-1) and 0 to 20 parts by weight of a cyclic ether compound (c) which is copolymerizable with trioxane.

4. The composition according to claim 3, wherein the monofunctional glycidyl compound (b-1) is selected from the group consisting of a glycidyl ether compound and a glycidyl ester compound, each having a molecular weight of 100 to 1000.

5. The composition according to claim 3, wherein the monofunctional glycidyl compound (b-1) is selected from the glycidyl ether compounds represented by the following formulae (II, (III) and (IV):

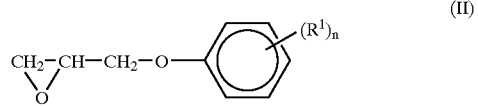

(II)

wherein $R^1$ is a $C_{1-12}$ alkyl group, a substituted alkyl group, an alkoxy group, an aryl group, a substituted aryl group or halogen; and n is an integer of 0 to 5 and, when n is 2 or more, the $R^1$s may be the same or different:

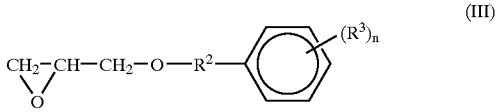

(III)

wherein $R^2$ is a $C_{1-30}$ alkylene group, a substituted alkylene group or a polyalkylene oxide glycol residue;

$R^3$ is a $C_{1-12}$ alkyl group, a substituted alkyl group, an alkoxy group, an aryl group, a substituted aryl group or halogen; and n is an integer of 0 to 5 and, when n is 2 or more, the $R^3$s may be the same or different:

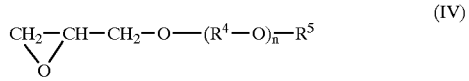

(IV)

wherein $R^4$ is a $C_{1-30}$ alkylene group; n is an integer of 0 to 20; and $R^5$ is a $C_{1-30}$ alkyl group, a $C_{2-20}$ alkenyl group or an alkynyl group.

6. The composition according to claim 1, wherein the branched polyacetal copolymer (A) is prepared by a copolymerization of 100 parts by weight of trioxane (a), 0.001 to 10 parts by weight of a branch-formable cyclic formal compound (b-2), and 0 to 20 parts by weight of a cyclic ether compound (c) which is copolymerizable with trioxane.

7. The composition according to claim 3, wherein the branched polyacetal copolymer (A) indispensably comprises the cyclic ether compound (c) copolymerizable with trioxane and is a copolymerized product of 0.1 to 20 parts by weight of the compound (c) to 100 parts by weight of trioxane.

8. The composition according to claim 3, wherein the cyclic ether compound (c) which is copolymerizable with trioxane is selected from the group consisting of ethylene oxide, 1,3-dioxolan, diethylene glycol formal and 1,4-butanediol formal.

9. The composition according to claim 1, wherein the compound (B) having a polyalkylene ether unit as the main constituting component is at least one compound selected from the group consisting of polyethylene glycol, polypropylene glycol, polytetramethylene glycol and a copolymer glycol having such a constituting unit.

* * * * *